United States Patent [19]

Clinton et al.

[11] Patent Number: 5,357,932
[45] Date of Patent: Oct. 25, 1994

[54] FUEL CONTROL METHOD AND SYSTEM FOR ENGINE WITH VARIABLE CAM TIMING

[75] Inventors: Eric L. Clinton, Southfield; Scott C. Kochen, Northville; Larry A. Hardy, Riverview, all of Mich.

[73] Assignee: Ford Motor Company, Dearborn, Mich.

[21] Appl. No.: 43,707

[22] Filed: Apr. 8, 1993

[51] Int. Cl.$^5$ .................... F02D 41/04; F02D 41/18
[52] U.S. Cl. .................... 123/488; 123/478
[58] Field of Search ............ 123/478, 480, 488, 494; 73/118.2

[56] References Cited

U.S. PATENT DOCUMENTS

| | | | |
|---|---|---|---|
| 4,987,888 | 1/1991 | Funabashi et al. | 123/488 |
| 5,029,569 | 7/1991 | Cullen et al. | 123/494 |
| 5,070,846 | 12/1991 | Dudek et al. | 123/494 X |
| 5,094,213 | 3/1992 | Dudek et al. | 123/478 |
| 5,117,784 | 6/1992 | Schechter et al. | 123/90.17 |
| 5,159,914 | 11/1992 | Follmer et al. | 123/494 |
| 5,209,202 | 5/1993 | Maurer et al. | 123/414 |
| 5,245,968 | 9/1993 | Kolias et al. | 123/414 |

*Primary Examiner*—Tony M. Argenbright
*Attorney, Agent, or Firm*—Roger L. May; Peter Abolins

[57] ABSTRACT

The amount of fuel injected in an engine with variable cam timing is more accurately reflective of engine operating conditions by accounting for the phase angle of the camshaft relative to the crankshaft in the calculation of the cylinder air charge. The cam phase angle for the existing engine speed is sensed and used in the calculation of a manifold filling coefficient which modifies the leakage compensated air flow data obtained from a mass air flow meter. A predicted final cylinder air charge is calculated based on the modified air charge from the manifold filling model and the required fuel for a desired air/fuel ratio is based on the calculated cylinder air charge.

9 Claims, 2 Drawing Sheets

FUEL CONTROL METHOD AND SYSTEM FOR ENGINE WITH VARIABLE CAM TIMING

TECHNICAL FIELD

This invention relates generally to fuel injection systems for internal combustion engines and more particularly to a method of accurately predicting cylinder air charge value in engines with variable cam timing in order to more accurately control the air/fuel mixture introduced into the engine.

BACKGROUND ART

Fuel injection systems for internal combustion engines typically include a mass air flow sensor for sensing air flow into the engine intake manifold. Data from the sensor is used to calculate a cylinder air charge from which the fuel injector pulse width needed to achieve a desired air/fuel ratio is determined. One prior art approach is disclosed in Follmer et al U.S. Pat. No. 5,159,914, assigned to the assignee of the present invention, and incorporated herein by reference. In Follmer et al a hot wire mass airflow sensor provides raw airflow rate data to the computer. The computer corrects the raw data to compensate for airflow leakage in the intake system. The compensated airflow data is used in a manifold filling model that modifies the data to account for the effects of engine load on volumetric efficiency of the engine. The computer calculates the cylinder air charge utilizing the modified data from the manifold filing model. After cylinder air charge is determined, the fuel injector pulse width necessary to achieve a desired air/fuel ratio is determined. Another method of predicting cylinder air charge is disclosed in U.S. Ser. No. 08/016,322 filed Feb. 10, 1993, assigned to the assignee of the present invention, the disclosure of which is incorporated herein by reference.

One measure taken to improve fuel efficiency and reduce harmful emissions in internal combustion engine is to vary the timing or relative phase angle between the camshaft and crankshaft to achieve more optimum engine operation at various speed/load conditions. One approach to phaseshift control is disclosed in Maurer et al U.S. Pat. No. 5,209,202 assigned to the assignee of the present invention and incorporated herein by reference. That phase shift control uses a hydraulic device which rotationally couples a camshaft drive sprocket to a camshaft flange. The engine control computer in the aforementioned patent responds to continuously varying engine operating conditions to control the hydraulic device and set the desired relative phase angle for the condition existing at any point in time. A suitable hydraulic device is disclosed in Schechter et al U.S. Pat. No. 5,117,784 assigned to the assignee of the present invention and incorporated herein by reference.

Volumetric efficiency (Veff) describes how effective an engine is at filling a cylinder and is expressed as a percentage of total cylinder capacity. Because the cylinder does not totally fill up with air and fuel, Veff typically varies from 50% to 85% of the total cylinder capacity. Veff is influenced by such factors as cylinder displacement, piston stroke, air intake geometry, and valve timing. The intake system, in particular the intake valve, restricts the amount of air which an engine can induct. Varying the cam timing in response to continuously varying engine operating conditions as discussed above affects the time when the intake valve opens and closes and thus changes the Veff of the engine. In order to maintain or improve fuel economy gains and the reductions in harmful emissions obtained with variable cam timing, it is desirable that the strategy for calculating cylinder air charge, and thus fuel pulse width, account for the changes in Veff which occur when cam timing is varied.

SUMMARY OF THE INVENTION

In accordance with the present invention the calculation of cylinder air charge, and thus fuel injector pulse width, is dependent on the instantaneous phase angle of the camshaft relative to the crankshaft. In particular, the calculation of the coefficient of manifold filling to be used in a manifold filling model is a function of calibration values which reflect the effect of cam phase angle and engine speed on Veff. The manifold filling model uses mass air flow sensor data which has been compensated for airflow leakage in the intake system. The manifold filling model modifies the compensated air flow data in accordance with the coefficient of manifold filling and thus reflects the relationship between Veff and the existing cam phase angle. The air charge computed by the manifold filling model is used in predicting a cylinder air charge to be used in calculating an injector pulse width to achieve a desired air/fuel ratio.

BRIEF DESCRIPTION OF THE DRAWINGS

A more complete understanding of the present invention may be had from the following detailed description in which.

BEST MODE FOR CARRYING OUT THE INVENTION

Figure 1:
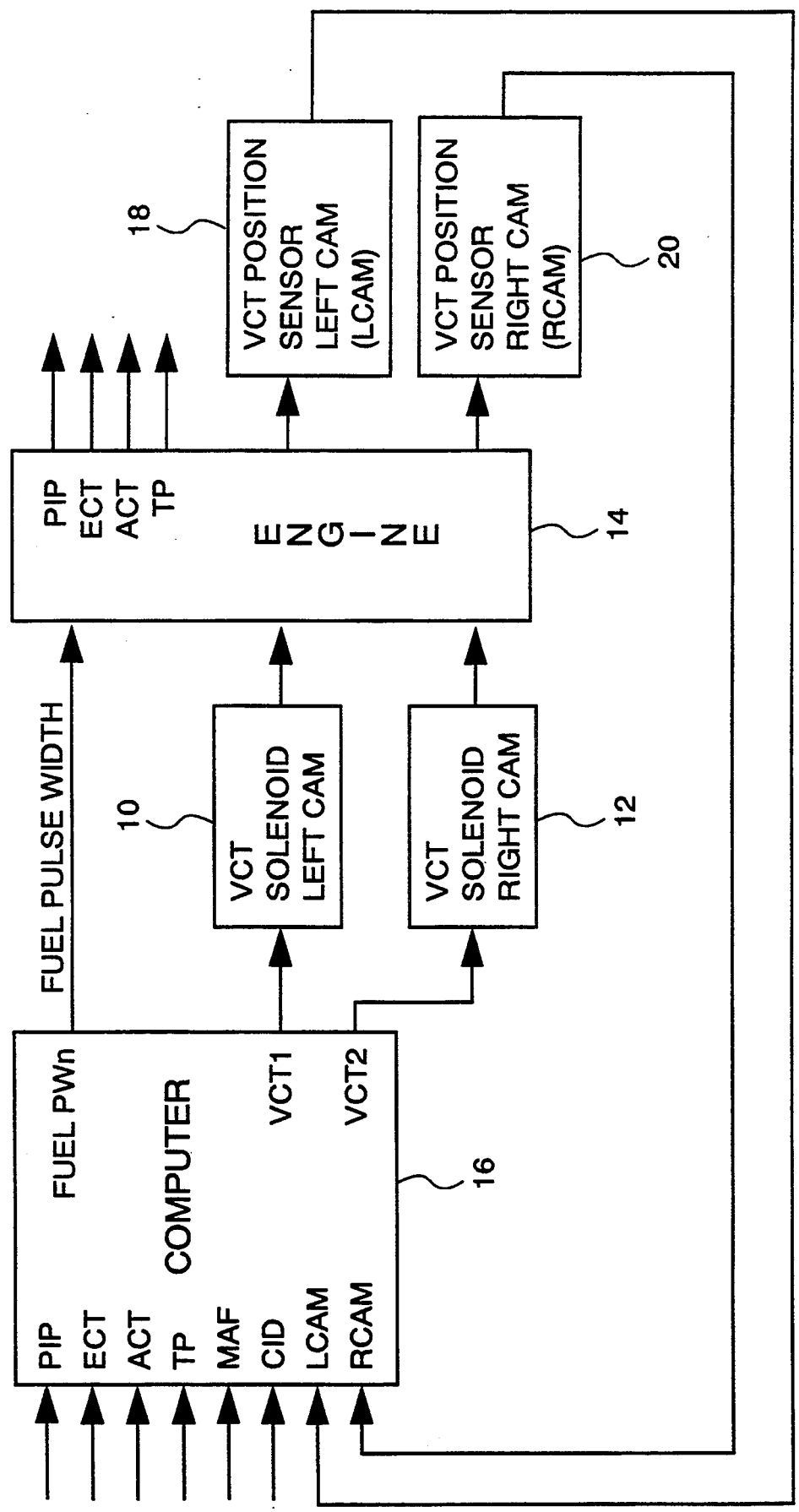
FIG. 1 is a block diagram of the apparatus of the invention.

Referring now to the drawings and initially to FIG. 1, a block diagram of the control system of the present invention is shown. Variable cam timing (VCT) solenoids 10 and 12 are employed to position respective pistons in a suitable hydraulic device to set the phase angle of the left and right camshafts respectively, relative to the crankshaft, of an internal combustion engine generally designated 14. The solenoid 10 is energized from a d-c source, not shown, under the control of a constant frequency variable duty cycle pulse width modulated (PWM) output signal VCT1 from an engine control computer generally designated 16. The computer 16 includes the usual input/output (I/O) section, read only memory (ROM), random access memory (RAM), and central processor unit (CPU). The solenoid 12 is controlled from a PWM output signal VCT2. Position sensors 18 and 20, such as disclosed in the aforementioned patent application, provide closed loop feedback control signals indicative of actual camshaft phase angle, to inputs LCAM and RCAM of the computer 16. One of the sensors, for example 18 may provide a cylinder identification signal at input CID of computer 16. A profile ignition pickup (PIP) signal provides crankshaft position, and thus engine speed, information to the computer 16 at input PIP and also provides the timing/interrupt signals to initiate airflow and fuel control calculations. The PIP signal, as discussed in the aforementioned patent application, may be generated in response to the output of a crankshaft sensor of conventional design. The computer 16 uses the CID, PIP, LCAM, and RCAM data as well as other engine operating parameter to compute the optimum VCT1 and VCT2 outputs in order to improve engine idle, increase engine torque, and aid in the reduction of harmful emissions. A PID control routine is performed in the computer 16 on the difference between the desired camshaft phase angle commanded and the actual camshaft phase angle measured in order reduce any error.

The computer 16 provides a fuel pulse width output (FUELPW) to the engine fuel injection system as will be described below in connection with various software modules which control the operation of the computer 16. Conventional sensors (not shown) for monitoring engine coolant temperature (ECT), air charge temperature (ACT), throttle position (TP), engine speed (RPM), and mass air flow (MAF) provide inputs to the computer 16 for use in determining the output FUELPW. The various analog inputs are periodically read under program control and converted to digital words by an A/D converter and stored in RAM for use by the CPU in calculating a digital word which defines FUELPW for each cylinder. FUELPW is converted to a variable duty cycle pulse width modulated control signal and supplied to a conventional fuel injection system including a plurality of fuel injectors.

Figure 2:
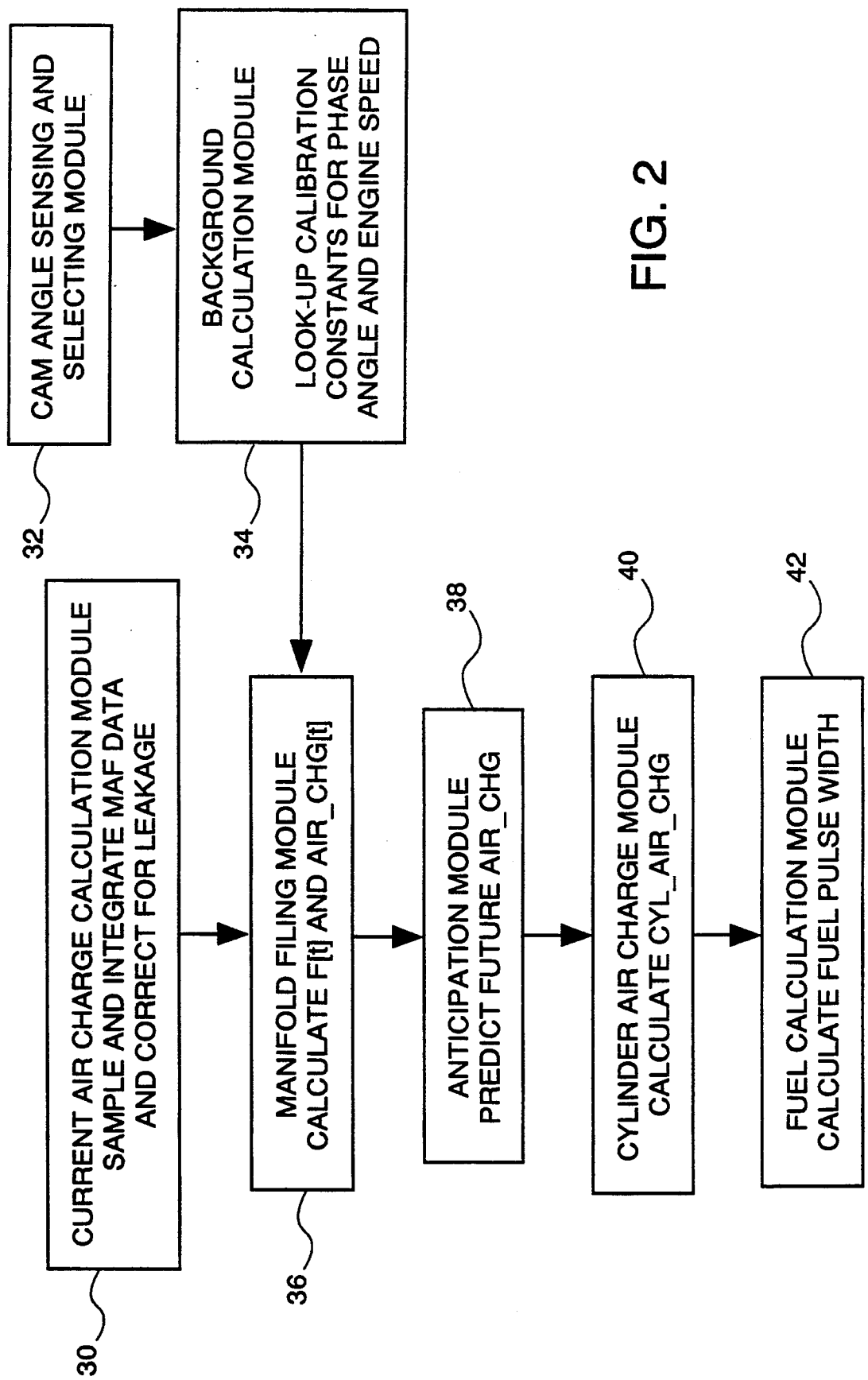
FIG. 2 is a flow chart of the software used to control the computer in FIG. 1.

Referring now to FIG. 2, a flowchart of the air and fuel calculation is shown. The output of the MAF sensor is converted to a digital value, and stored in RAM of computer 16. A Current Air Charge Calculation module 30 integrates the MAF data over two sample periods to obtain a current integrated air mass value AM_INT[t]. An air mass amount, AIR_CHG_COMP, represents the sum of the air leakage in the intake manifold i.e. air flow not measured by the MAF sensor, and airmeter drift components. AIR_CHG_COMP is calculated and added to the value AM_INT[t] to obtain a current air charge, AIR_CHG_CUR[t] where [t] is used to identify the current integrated air charge value. The previous integrated air charge calculation, is hereinafter referred to as AIR_CHG_CUR[t−1].

A Cam Angle Sensing and Selection module 32 reads the LCAM and RCAM inputs representing the sensed phase angle of the left and right engine banks and selects the input having the greater angle i.e. the one which is most retarded relative to the crankshaft. This selection results in the slowest time constant for the manifold filling model. In other words, using the most retarded phase angle produces a smaller manifold filling coefficient and therefore a slower response to changes in air flow. The digital word corresponding to the angle so selected is designated AIR_PHASE and is stored in the RAM of the computer 16.

An Air Charge Background Calculation module 34 performs two table look-up functions using the values of AIR_PHASE and RPM stored in RAM. The values contained in the tables relate to the slope, SL, and offset to be used in calculating an inferred manifold absolute pressure value, INF_MAP, for the cam angle and engine speed of interest. The value of the constants stored in the look-up tables are obtained from tests performed on the vehicle of interest, to determine the effect of variation in cam phase angle over a range of engine speeds on the manifold absolute pressure and thus volumetric efficiency. An interpolation routine will normally be performed on the values obtained from each look-up table to obtain the value for the speed and angle of interest. The offset obtained from the look-up table is preferably corrected for barometric pressure, BP, by a multiplier obtained from a third look-up table using BP as the input. The corrected offset is hereinafter referred to as OFF. Using these look-up table values, MAP may be inferred as follows:

$$INF\_MAP[t] = SL*AIR\_CHG[t-1] + OFF.$$

Veff may be expressed as actual air charge at a given MAP corrected for air charge temperature (ACT) and engine coolant temperature (ECT) divided by the theoretical air charge if the cylinder were filled with air at the given MAP or:

$$Veff = AIR\_CHG[t-1]*FN(ACT,ECT)/AIR\_THEO[t]$$

where $$AIR\_THEO[t] = INF\_MAP[t]*(ENGDIS/ENGCYL)*8.488E^{-5}$$

Thus:

$$Veff = \frac{AIR\_CHG[t-1]*FN(ACT,ECT)*11781.34}{INF\_MAP[t]*(ENGDIS/ENGCYL)}$$

where
ENGDIS refers to the engine displacement,
ENGCYL refers to the number of cylinder in the engine, and
FN(ACT,ECT) is a calibration constant obtained from a look-up table using as inputs the value of ACT and ECT.

A Manifold Filling module 36 calculates a manifold filling coefficient F[t] which is used as a multiplier to modify the AIR_CHG_CUR[t] value obtained from module 30, to obtain a corrected air charge value AIR_CHG[t], to account for the change in volumetric efficiency that results from a change in cam phase angle. The background calculations performed by the module 34 are synchronous to the foreground calculations performed by the module 36 and subsequent module in the flow chart. The values calculated by module 34 are stored in RAM and are available for use by module 36 at the time AIR_CHG_CUR[t] is available from module 30. The module 34 stores the two values SL and OFF in RAM for use by the module 36, as well as a third value designated AIR_NUM_MULT which represents the constant 11781.34/(ENGDIS/ENGCYL) as modified by the multiplier FN(ACT,ECT). The module 36 uses these values to calculate:

$$F[t] = \frac{AIR\_NUM\_MULT}{SL + (OFF/AIR\_CHG[t-1])}$$

where AIR_CHG[t−1] is the previously calculated and stored value of AIR_CHG[t]. The value of F[t] is stored as F[t−1] for use during the next calculation so that the volumetric efficiency changes from one event to the next are compensated. If F[t] is not equal to zero, then the module 36 calculates an air charge value corrected to reflect the existing cam phase angle in accordance with the following equation:

$$AIR\_CHG[t] = F[t]*AIR\_CHG\_CUR[t] +$$

-continued
$$\frac{F[t]}{F[t-1]}*(1-F[t])*\text{AIR\_CHG}[t-1]$$

If F[t] is equal to zero, as during initialization, then:

$$\text{AIR\_CHG}[t]=\text{AIR\_CHG\_}(t-1)$$

The value AIR_CHG[t] is used by an Anticipation Module 38 which predicts the air charge two events in the future in order to account for fuel scheduling delays. The calculations performed in module 38 are based on the assumption of linear changes in AIR_CHG_CUR[t] for the next event [t+1] and that no change occurs from that level for the following [t+2] event. The calculations performed in module 38 are also based on the assumption that the manifold filling coefficient F[t] remains the same for the next two events. Thus:

$$\text{AIR\_CHG}(t+2)=F[t]*(2-F[t])*(2*\text{AIR\_CHG\_CUR}[t]-\text{AIR\_CHG\_CUR}[t-1])+((1-F[t])^2*\text{AIR\_CHG}[t])$$

The anticipated air charge value AIR_CHG[t+2] is stored in RAM and used by a Final Aircharge module 40 in determining a CYL_AIR_CHG. CYL_AIR_CHG is used by a Fuel Calculation module 42 in determining the cylinder fuel charge and the corresponding injector pulse width FUELPW, needed to achieve a desired air/fuel ratio. The anticipation performed by module 38, may produce an AIR_CHG[t+2] value which is greater than the maximum possible engine air flow and therefore should not be used in calculating fuel flow. The module 40 compares AIR_CHG[t+2] with a maximum anticipated air flow threshold value, AIR_WOT_ANT, calculated by module 34 using the engine standard air charge corrected for ACT, ECT, RPM, relative throttle position and barometric pressure. If AIR_CHG[t+2] is greater than AIR_WOT_ANT, then CYL_AIR_CHG is set equal to the output of the manifold filling model, AIR_CHG[t]. A second threshold value, AIR_CHG_WOT, which is the maximum air charge for the engine of interest, is used to limit CYL_AIR_CHG to the maximum engine air charge.

While the best mode for carrying out the invention has been described in detail, those familiar with the art to which this invention relates will recognize various alternative designs and embodiments for practicing the invention as defined by the following claims.

We claim:

1. A method of determining the amount of fuel to be injected into a cylinder of an internal combustion engine having means for varying the phase angle of at least one camshaft of the engine relative to the crankshaft of the engine, comprising the steps of:
   (a) calculating an air charge value based on measured air flow into the engine;
   (b) sensing the engine speed and the phase angle of the camshaft relative to said crankshaft at the engine speed sensed;
   (c) calculating a manifold filling coefficient as a function of the engine speed and phase angle sensed in step (b);
   (d) modifying the air charge calculated in step (a) by the manifold filling coefficient calculated in step (c);
   (e) calculating a cylinder air charge utilizing the modified air charge produced by step (d); and
   (f) calculating a cylinder fuel charge to achieve a desired air/fuel ratio.

2. The method defined in claim 1 wherein the step of calculating an air charge value includes the step of integrating the mass air flow measured by an air meter over at least two sample periods and adding an amount equal to air leakage.

3. The method defined in claim 1 wherein the engine has means for varying the phase of a left bank camshaft and a right bank camshaft and the phase angle used in step (c) is the more retarded one of the left or right bank camshafts relative to the crankshaft.

4. The method defined in claim 3 wherein the engine speed and cam phase angle sensed in step (b) are used to access a first and second look-up tables to obtain a first and second calibration constants representing respectively the slope and the offset of the cylinder air charge versus manifold absolute pressure curve for the engine speed and cam phase angle sensed, the calibration constant being used in the calculation of the manifold filling coefficient in step (c).

5. The method defined in claim 4 wherein the look-up table data is used to infer a manifold absolute pressure.

6. A system for controlling the operation of an internal combustion engine having at least one camshaft and a crankshaft comprising;
   means including computer means for controlling the phase angle of the camshaft relative to the crankshaft,
   means for sensing said phase angle and the speed of said engine,
   means for measuring mass air flow inducted into said engine,
   said computer means being programmed to calculate an air charge value based on measured mass air flow, modify the calculated air charge value by a manifold filling coefficient related to said engine speed and said phase angle, calculate a cylinder air charge based on the modified air charge and calculate a fuel injector pulse width value, based on the calculated cylinder air charge, for controlling the operation of the engine at a desired air/fuel ratio.

7. The system defined in claim 6 wherein the calculated air charge represents the integration of measured mass air flow data over at least two samples periods plus an amount equal to air leakage.

8. The system defined in claim 6 wherein the engine includes a left bank camshaft and a right bank camshaft and the phase angle used by said computer means is the more retarded one of the left or right bank camshafts relative to the crankshaft.

9. A method of determining the amount of fuel to be injected into a cylinder of an internal combustion engine having means for varying the phase angle of at least one camshaft of the engine relative to the crankshaft of the engine, comprising the steps of:
   (a) measuring the mass air flow being inducted into the engine;
   (b) sensing the engine speed;
   (c) sensing the phase angle of the camshaft relative to said crankshaft at the engine speed sensed;
   (d) sensing the engine coolant temperature;
   (e) sensing the temperature of the air entering the engine
   (f) calculating an air charge value based on said measured air flow;

(g) calculating a manifold filling coefficient as a function of the engine speed, camshaft phase angle, coolant temperature and air temperature, (h) modifying the air charge calculated in (f) by the manifold filling coefficient calculated in (g);

(i) calculating a cylinder air charge utilizing the modified air charge produced by step (h); and (j) calculating a cylinder fuel charge to achieve a desired air/fuel ratio.

* * * * *